(12) United States Patent
Sato

(10) Patent No.: US 6,764,332 B2
(45) Date of Patent: Jul. 20, 2004

(54) BATTERY-DRIVEN EQUIPMENT HAVING A LOW-PROFILE VIBRATOR

(75) Inventor: Kazuaki Sato, Kadoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/352,170

(22) Filed: Jan. 28, 2003

(65) Prior Publication Data

US 2003/0143888 A1 Jul. 31, 2003

(30) Foreign Application Priority Data

Jan. 29, 2002 (JP) .......................... 2002-019675

(51) Int. Cl.⁷ .................. H01R 4/38; H01R 13/648; H01R 3/00
(52) U.S. Cl. ...................... 439/382; 439/500
(58) Field of Search .................. 439/382, 500; 361/752

(56) References Cited

U.S. PATENT DOCUMENTS 5,943,214 A * 8/1999 Sato et al. ............... 361/752
6,413,117 B1 * 7/2002 Annerino et al. .......... 439/500
6,542,381 B1 * 4/2003 Sei et al. ................. 361/801
6,600,937 B1 * 7/2003 Horngren ................ 455/567

FOREIGN PATENT DOCUMENTS

| JP | 2000078790 A | 3/2000 |
|----|--------------|--------|
| JP | 2001037147 A | 2/2001 |
| WO | WO 99/23801 | 5/1999 |

* cited by examiner

Primary Examiner—Chandrika Prasad
(74) Attorney, Agent, or Firm—Parkhurst & Wendel, L.L.P.

(57) ABSTRACT

To provide battery-driven equipment whereby when a vibrator is installed into a housing of the battery-driven equipment, a body of the battery-driven equipment is reduced in thickness while improving workability of installation and positively holding a vibrator to increase reliability and positively holding the vibrator to increase electrical and mechanical reliability. In the present invention, feeding terminals are caused to protrude to a rear of the vibrator from a bottom of a case of the motor in such a way that the feeding terminals of the vibrator and feeding lands of the battery-driven equipment are electrically connected within a height range in the diameter direction of the vibrator, and the feeding terminals protrude within the height range in the diameter direction of the vibrator while tilting with respect to an extending line of a rotation axis.

11 Claims, 9 Drawing Sheets

BATTERY-DRIVEN EQUIPMENT HAVING A LOW-PROFILE VIBRATOR

FIELD OF THE INVENTION

The present invention relates to battery-driven equipment mainly used for portable electronic equipment such as a mobile phone and PIM (personal information management) equipment and particularly concerns a holding structure of the equipment and an electronic connection structure.

BACKGROUND OF THE INVENTION

Some kinds of battery-driven equipment, particularly some kinds of portable information equipment such as a mobile phone and PIM (personal information management) equipment have the function of transmitting information by body sensing vibration. When a vibrator is attached in such battery-driven equipment, a structure for attaching the vibrator via an elastic body to protect the vibrator from falling impact of the battery-driven equipment.

FIGS. 9A and 9B show an example of such a structure of equipment disclosed in JP2000-78790A. In FIGS. 9A and 9B, a vibrator vibrated by an eccentric weight 82 comprises feeding terminals 84, which protrudes from a case 83 of a motor 81 and is electrically connected to feeding lands 93 on an attaching plate 91 of battery-driven equipment, and an elastic body 85 for covering the case 83, and the vibrator forms an elastic pressing body 86 which can be pressed and deformed on a part of the elastic body 85. Further, when the vibrator is attached into the battery-driven equipment, the elastic pressing body 86 presses the feeding terminals 84 onto the feeding lands 93 by pressing the case to combine the elastic force of the feeding terminals 84 and the pressing force of the elastic pressing body 86 and have compatibility of holding and electric connection of the vibrator.

A smaller and thinner battery-driven equipment has grown in demand in recent years. Further, smaller and thinner vibrators have grown in demand accordingly. Additionally, a vibrating amount-equal to that of the conventional vibrator has been demanded. Thus, not only reduction in a thickness of a vibrator but also reduction of a spaced required for holding the vibrator and making electric connection have been considerably important.

However, in the above conventional holding structure, the feeding terminals 84 pressed onto the feeding lands 93 of the battery-driven equipment by the elastic pressing body 86 has an end fixed to the bottom of the case 83 and the other end not making connection, and the feeding terminals 84 protrude between the attaching plate 91 and the case 83. Hence, the dimension of the vibrator in the diameter direction is increased, thereby preventing formation of slim equipment.

DISCLOSURE OF THE INVENTION

The present invention is achieved to solve the above-described problem. Namely, a battery-driven equipment is provided which can achieve a slim body while improving workability of installation and positively holding a vibrator to increase electrical and mechanical reliability when the vibrator is installed into a housing of the battery-driven equipment.

In order to solve the above-described problem, in the battery-driven equipment of the present invention, feeding terminals are caused to protrude rearward of the vibrator from the bottom of a case in such a manner as to electrically connect the feeding terminals of the vibrator and feeding lands of the battery-driven equipment within a height range in the diameter direction of the vibrator, and the feeding terminals protrude within a height range in the diameter direction of the vibrator while tilting with respect to an extending line of the rotation axis of a motor. Further, the battery-driven equipment is configured in such a way that at least a part of the case of the motor is covered with an elastic body, the motor constituting the vibrator, the vibrator covered with an elastic body is sandwiched and fixed between the bottom and top surfaces of the housing, an elastic pressing body is placed between the feeding terminals and the bottom surface of the housing, and pressing force which is caused by elastic deformation of the feeding terminals and applied to feeding lands of the battery-driven equipment is combined with pressing force caused by elastic deformation of the elastic pressing body.

This configuration allows a battery-driven equipment to have a slim body.

A first invention comprises a motor, an eccentric weight attached to the rotation axis of the motor, a vibrator having feeding terminals of plate springs which protrude from a case of the motor and are electrically connected to feeding lands of battery-driven equipment, a housing for storing and fixing therein the vibrator, and a substrate having the feeding lands, the vibrator being interposed and fixed between the bottom of the housing and the top surface of the housing, in which the feeding terminals of the vibrator and the feeding lands of the battery-driven equipment are electrically connected within a height range in the diameter direction of the vibration, and the feeding terminals of the vibrator and the feeding lands are electrically connected at a position not permitting superimposition of the vibrator in the diameter direction.

A second invention is the battery-driven equipment according to the first invention, in which the feeding terminals of the vibrator are caused to protrude rearward of the vibrator from the bottom of the case of the motor and protrude within the height range in the diameter direction of the vibrator while tilting with respect to an extending line of the rotation axis of the motor. The feeding terminals are formed to protrude around from the outer circumference of the case while tilting with respect to the substrate of the battery-driven equipment, so that it is possible to increase a spring length of the feeding terminals, thereby stabilizing a spring pressure and lowering a resonance frequency.

A third invention is the battery-driven equipment according to the first and second inventions, in which at least a part of the case of the motor is covered with an elastic body, the motor constituting the vibrator, and the vibrator covered with the elastic body is interposed and fixed between the bottom of the housing and the top surface of the housing. The vibrator can be protected from falling impact or the like of the battery-driven equipment.

A fourth invention is the battery-driven equipment according to the third invention, in which the elastic body is a synthetic rubber. It is possible to readily obtain a feeding terminal pressing structure having an insulating property and a damping vibration property and to simultaneously obtain large extending deformation on the elastic body.

A fifth invention is the battery-driven equipment according to the first to fourth inventions, in which an elastic pressing body is placed between the feeding terminals of the vibrator and the bottom of the housing and pressing force which is caused by elastic deformation of the feeding terminals and applied to the feeding lands of the battery-driven equipment is combined with pressing force caused by elastic deformation of the elastic pressing body. The feeding terminals of the vibrator and the feeding lands can be brought into contact with each other with stability.

A sixth invention is the battery-driven equipment according to the fifth invention, in which the elastic pressing body is formed integrally with the elastic body. It is possible to improve workability of installation.

A seventh invention is the battery-driven equipment according to the fifth invention, in which the elastic pressing body and the elastic body are separately formed. The elastic body and the elastic pressing body can be made of different materials.

An eighth invention is the battery-driven equipment according to any one of the fifth to seventh inventions, in which the pressing force caused by elastic deformation of the elastic pressing body is larger than the pressing force which is caused by elastic deformation of the feeding terminals and applied to the feeding lands of the battery-driven equipment. When pressing force cannot be sufficiently obtained by elastic deformation of the feeding terminals, pressing force of the feeding lands can be obtained by pressing force caused by elastic deformation of the elastic pressing body.

A ninth invention is the battery-driven equipment according to anyone of the fifth to eighth inventions, in which a rib is formed on the elastic pressing body to protrude between a pair of the feeding terminals. The rib makes it possible to prevent deformation on the feeding terminals of the vibrator, to obtain a pitch of the feeding terminals, and to prevent displacement from the elastic pressing body for pressing the feeding terminals.

A tenth invention is battery-driven equipment according to the ninth invention, in which a locking part is formed on the rib, the locking part protruding to be locked to at least a part of a contact side of the feeding terminals and the lands of the battery-driven equipment. Upon installation to the battery-driven equipment, the locking part of the rib is locked to the feeding terminals to prevent the elastic pressing body from being distorted in a separating direction from the feeding terminals.

An eleventh invention is battery-driven equipment according to the tenth invention, in which the rib is shaped like a letter T. A part crossing the axis of the vibrator of the T-shaped rib serves as a locking part. Upon installation to the battery-driven equipment, the locking part is locked to the feeding terminals to prevent the elastic pressing body from being distorted in a separating direction from the feeding terminals.

As is apparent from the above description, in the battery-driven equipment of the present invention, the feeding terminals of the vibrator and the feeding lands of the battery-driven equipment are electrically connected in a height range in the diameter direction of the vibrator. Hence, the battery-driven equipment can have a slim body.

Further, the feeding terminals are formed to protrude from around outer circumference of the bottom of the case while tilting with respect to the substrate of the battery-driven equipment. Thus, the feeding terminals can have a long spring length in a limited space. Hence, a spring pressure is stabilized and a resonance frequency can be lowered, so that it is possible to increase reliability of electrical connection and to widen a permissible range of variations in dimensions, resulting in preferable productivity.

Moreover, the elastic pressing body is placed on the back of the feeding terminals to combine pressing force caused by elastic deformation of the feeding terminals with pressing force caused by elastic deformation of the elastic pressing body. Thus, it is possible to bring the feeding terminals and the feeding lands into contact with stability and to reduce the thickness while increasing reliability of the battery-driven equipment. Additionally, pressing force which is caused by elastic deformation of the feeding terminals and is applied to feeding lands of the battery-driven equipment is larger than pressing force caused by elastic deformation of the elastic pressing body, so that when pressing force cannot be sufficiently obtained by elastic deformation of the feeding terminals, pressing force of the feeding lands can be obtained by pressing force caused by elastic deformation of the elastic pressing body.

Furthermore, the rib protruding between the feeding terminals is formed on the elastic pressing body, so that the rib makes it is possible to prevent deformation on the feeding terminals of the vibrator and obtain a pitch of the feeding terminals. Moreover, since displacement from the elastic pressing body for pressing the feeding terminals can be prevented, it is possible to prevent short circuit between the feeding terminals and displacement between the feeding terminals and the feeding lands.

Besides, the locking part shaped like a letter T is formed on the rib, so that the locking part is locked to the feeding terminals to prevent the elastic pressing body from being distorted in a separating direction from the feeding terminals, thereby improving workability of installation.

As described above, when the vibrator is installed into the housing of the battery-driven equipment, the body of the battery-driven equipment is reduced in thickness and the vibrator is positively held while improving workability of installation to increase reliability, thereby achieving battery-driven equipment with electrical and mechanical reliability.

DESCRIPTION OF THE PREFERRED EMBODIMENTS

The following will discuss specific embodiments of the present invention in accordance with the accompanied drawings. The technical scope of the present invention is not limited to the following embodiments.

(Embodiment 1)

Figure 1A:
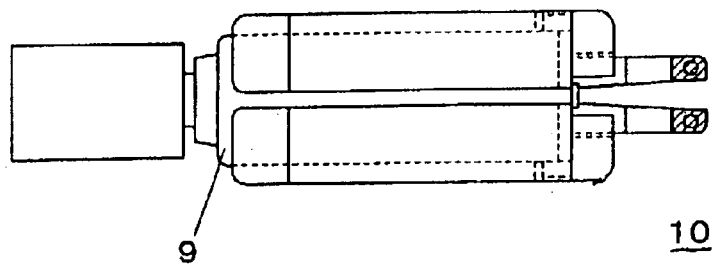
FIG. 1A is a plan view showing a vibrator according to an embodiment of the present invention.

FIGS. 1A to 1D show a main part of battery-driven equipment according to Example 1. In FIG. 1A, a vibrator 10 is composed of a motor 9 and an eccentric weight 11, and the eccentric weight 11 is attached to a rotation axis protruding from an end of the motor 9. A motor mechanism for rotatably driving the rotation axis is stored in a case 12. The eccentric weight 11 is formed by cutting a cylindrical weight substantially into halves. The rotation axis is brought into contact with a cutting surface and is fixed, thereon, and the eccentric weight 11 is attached asymmetrically with respect to an axis center of the rotation axis. Feeding terminals 13 formed by plate springs protrude in a rear direction around from the outer circumference of the rear end face of the case 12. Namely, the feeding terminals 13 have ends extending in the rear direction (opposite direction from the eccentric weight 11 of the vibrator 10) in straight lines around from the outer circumference of the rear end face of the case 12. The ends protrude and are bent halfway with inclination toward a rear extending line of the rotation axis of the motor 9. Further, contacts are formed on the other ends of the feeding terminals 13. Besides, the feeding terminals 13 do not protrude off the side of the vibrator 10 and are placed within a height range in the diameter direction of the vibrator. Moreover, an elastic body (boot) 18 made of a synthetic rubber is mounted on the case 12.

Figure 1B:
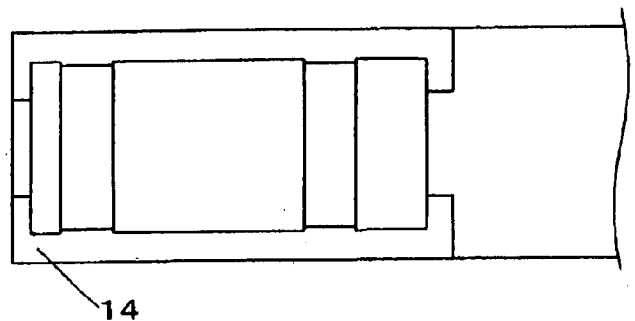
FIG. 1B is a plan view showing a housing according to an embodiment of the present invention.
Figure 1C:
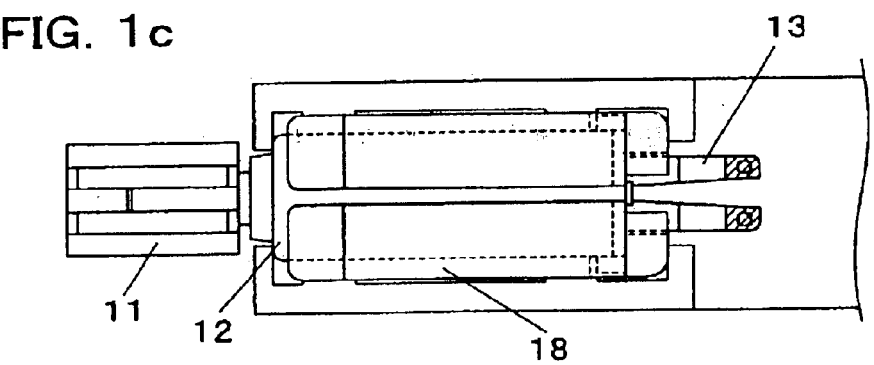
FIG. 1C is a plan view showing a main part of battery-driven equipment in which the vibrator is installed into the housing.

Then, the vibrator 10 assembled thus is installed into the battery-driven equipment. FIG. 1B shows the bottom of a housing 14. Protrusions and depressions are formed on the housing 14 to correspond to the outer contour of the vibrator 10. FIG. 1C shows a state in which the vibrator 10 is stored in the housing 14 and is fixed therein. The battery-driven equipment has the housing 14, and after the vibrator is press-fitted and fixed into the housing 14, the vibrator 10 is interposed between the bottom (lower case) of the housing 14 and the top surface (upper case) of a housing 15 to fix the vibrator.

Figure 1D:
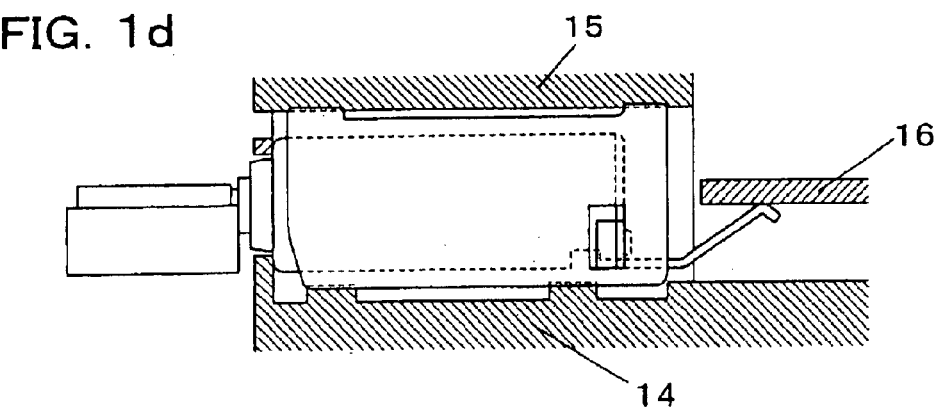
FIG. 1D is a front view (sectional view showing the housing) of FIG. 1C.

As shown in FIG. 1D, a substrate 16 of the battery-driven equipment is placed at the rear of the vibrator 10. The substrate 16 is placed on an extending line around the center in the diameter direction of the vibrator 10. The substrate 16 has feeding lands (not shown) and the motor 9 is fed by crimping the contacts of the feeding terminals 13 protruding in a rear direction from the rear end face (bottom) of the case 12.

When the rotation axis of the motor 9 rotates, vibration occurs on the vibrator 10 due to the eccentric weight 11, and the vibration is transmitted to the battery-driven equipment via the elastic body (boot) 18 and the housing 14 to provide notification of the vibration.

With the above-described configuration, the feeding terminals 13 protruding from the rear end face of the case 12 are not placed off the side of the case 12. Thus, it is possible to reduce the dimension in the diameter direction of the vibrator.

Further, the axis center of the vibrator 10 is positioned around a centerline in the height direction of an internal space of the battery-driven equipment surrounded by the housings 14 and 15. Thus, the substrate 16 of the battery-driven equipment is positioned on an extending line of the centerline, so that electronic components or the like can be mounted on both sides of the substrate 16. Consequently, such a configuration is suitable for high-density packaging.

(Embodiment 2)

Figure 2A:
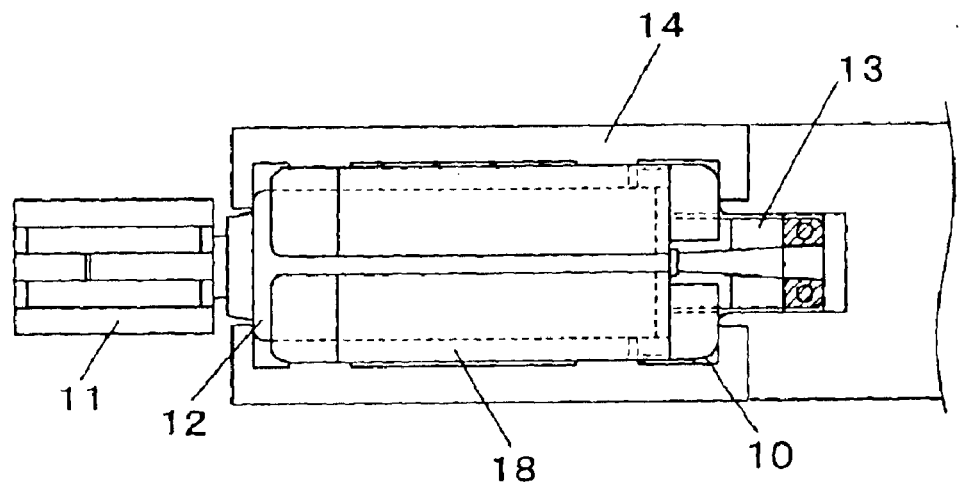
FIG. 2A is a plan view showing a main part of battery-driven equipment in which an elastic pressing body is integrally formed with an elastic body of the present invention.
Figure 2B:
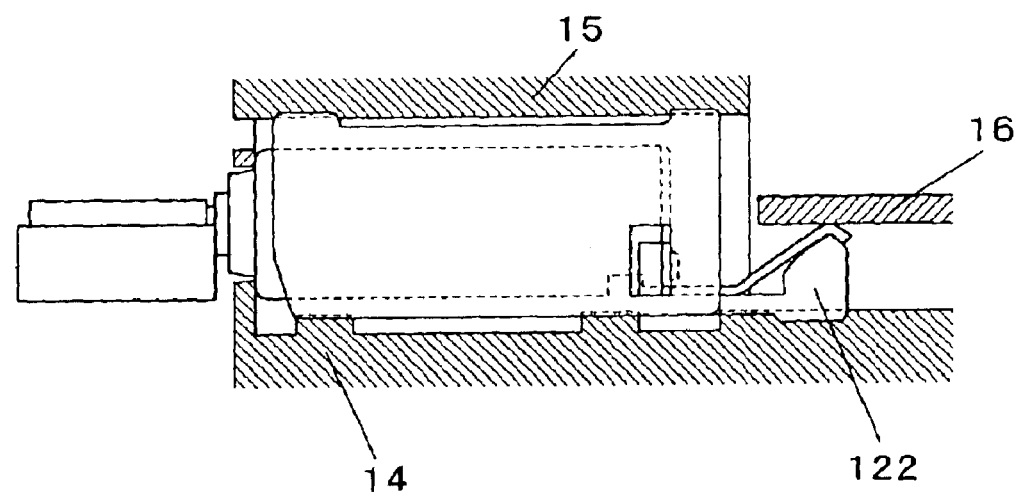
FIG. 2B is a front view (sectional view showing a housing) of FIG. 2A.

FIGS. 2A to 2B show a main part of battery-driven equipment in which an elastic pressing body is provided. In FIG. 2, the same constituent elements as those of FIGS. 1A to 1D are indicated by the same reference numerals and the description thereof is omitted.

An elastic pressing body 122 is formed on the back (a surface opposite from a surface in contact with a substrate 16) of feeding terminals 13 integrally with an elastic body (boot) 18. Namely, the elastic pressing body 122 protrudes in a rear direction (an opposite direction from the eccentric weight 11) around from the outer circumference of the rear end of the elastic body 18, a protruding part 123A protrudes in the direction of a substrate 16, and the contacts of the feeding terminals 13 are press-welded to feeding lands (not shown) of the substrate 16, so that poor contact is eliminated between the feeding terminals 13 and the feeding lands.

Figure 3A:
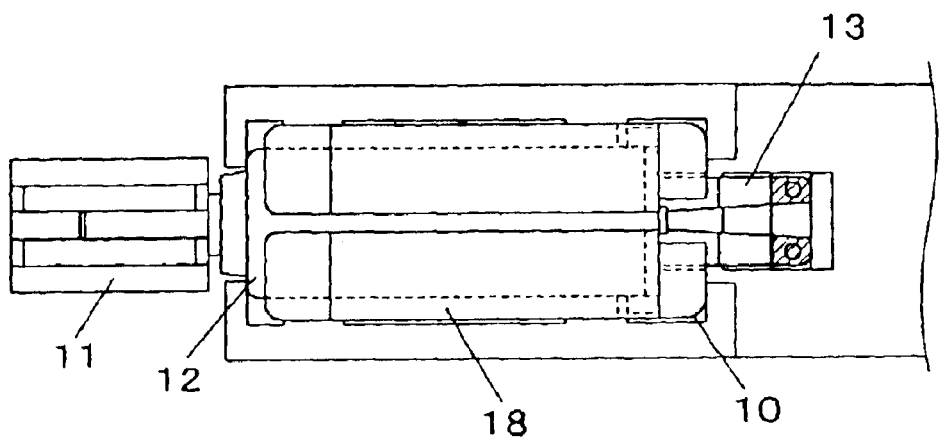
FIG. 3A is a plan view showing a main part of battery-driven equipment in which an elastic pressing body is formed separately from the elastic body of the present invention.
Figure 3B:
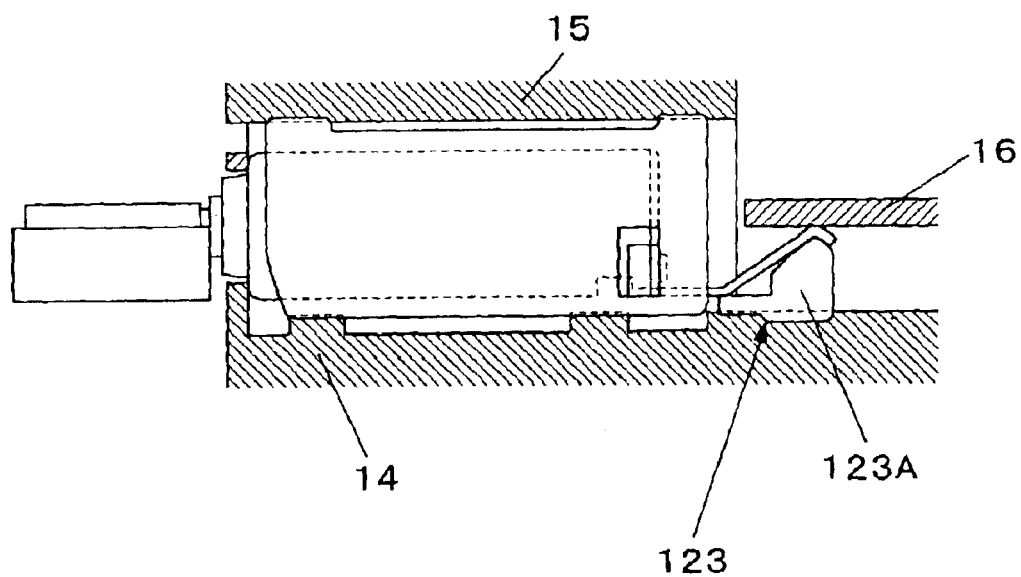
FIG. 3B is a front view (sectional view showing the housing) of FIG. 3A.

Moreover, unlike FIG. 2, battery-driven equipment shown in FIGS. 3A and 3B has an elastic pressing body 123 formed on the back (a surface opposite from a surface in contact with a substrate 16) of feeding terminals 13 separately from an elastic body (boot) 18.

With the above-described configurations, the elastic pressing body 122 protruding from the rear end face of the elastic body 18 is within a height range in the diameter direction of the vibrator 10, thereby reducing the dimension in the diameter direction of the vibrator.

In this way, the elastic pressing body 122 or 123 is placed on the back sides of the feeding terminals 13, so that pressing force caused by elastic deformation of the feeding terminals 13 and pressing force caused by the elastic deformation of the elastic pressing body 122 or 123 are combined.

Besides, when the elastic pressing body 123 is formed separately from the elastic body (boot) 18, the two elastic body (boot) 18 and elastic pressing body 123 can be made of different materials. Thus, for example, the elastic pressing body 123 for pressing the feeding terminals 13 is made of an insulating synthetic rubber to secure insulation of the feeding terminals 13 while the elastic body (boot) 18 mounted in a case 12 is made of a synthetic rubber having conductivity and makes contact with the case 12.

(Embodiment 3)

Figure 4A:
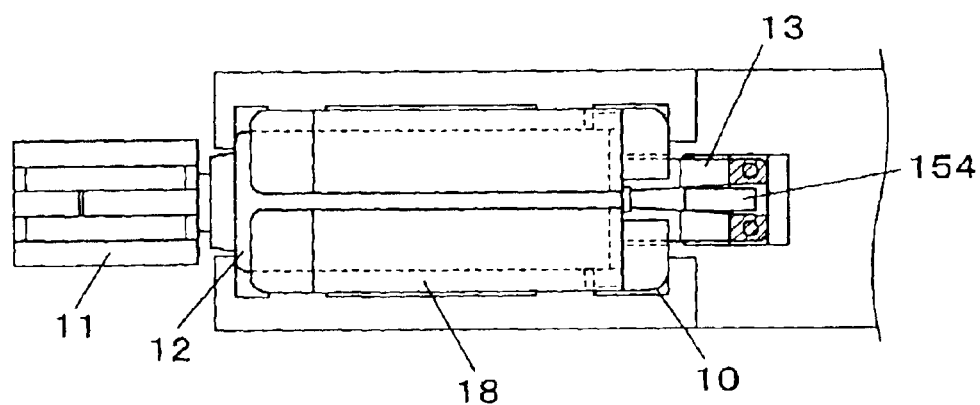
FIG. 4A is a plan view showing a main part of battery-driven equipment in which an elastic pressing body forms a rib of the present invention.
Figure 4B:
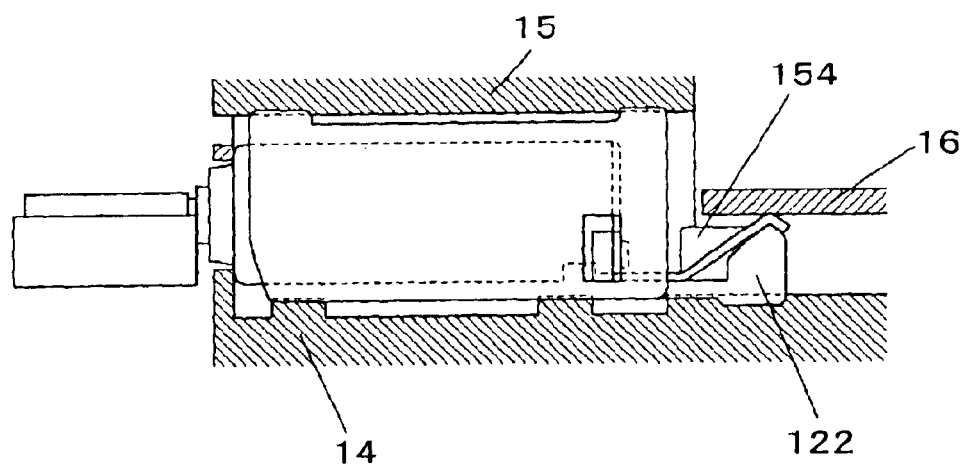
FIG. 4B is a front view (sectional view showing a housing) of FIG. 4A.

FIGS. 4A to 4B show a main part of battery-driven equipment in which an elastic pressing body forming a rib is provided. In FIGS. 4A to 4D, the same constituent elements as those of FIGS. 1A to 1D, 2A and 2B are indicated by the same reference numerals and the description thereof is omitted.

A rib 154 is formed to protrude to a substrate 16 between feeding terminals 13 of an elastic pressing body 122 which is placed integrally with an elastic body (boot) 18 on the back (a surface opposite from a surface in contact with the substrate 16) of the feeding terminals 13. Additionally, the rib 154 may be formed on the elastic pressing body 123.

The rib 154 reinforces the structures of the elastic pressing bodies 122 and 123 to eliminate deformation, prevents displacement of the elastic pressing body 122 for pressing the feeding terminal 13, and positively connects feeding lands on the substrate 16 of the battery-driven equipment. The rib 154 can prevent the occurrence of short circuit between the feeding terminals 13, so that the rib 154 is preferably made of an insulating synthetic rubber.

(Embodiment 4)

Figure 5A:
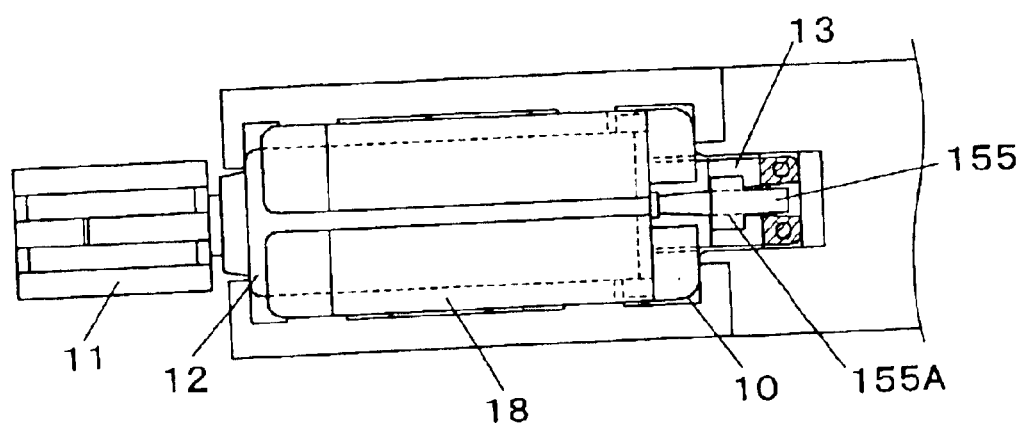
FIG. 5A is a plan view showing a main part of battery-driven equipment in which an elastic pressing body forms a locking part of the present invention.
Figure 5B:
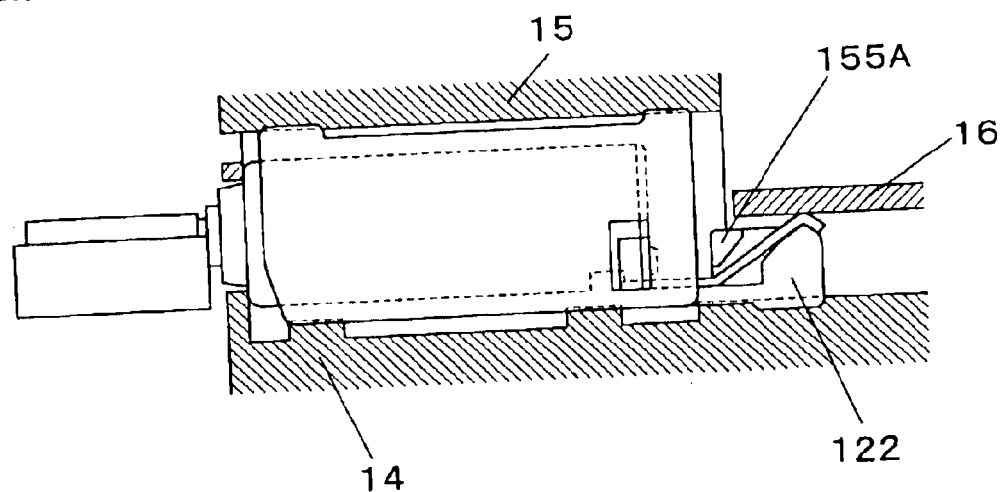
FIG. 5B is a front view (sectional view showing a housing) of FIG. 5A.

FIGS. 5A and 5B show a main part of battery-driven equipment in which an elastic pressing body forming a locking part is provided.

In FIGS. 5A and 5B, the same constituent elements as those of FIGS. 1A to 1D, 2A and 2B are indicated by the same reference numerals and the description thereof is omitted.

The battery-driven equipment of FIGS. 5A and 5B is different from that of FIG. 2 in that a rib 155 forming a locking part 155A for locking feeding terminals 13 is provided integrally with an elastic body (boot) 18 on an elastic pressing body 122, which is provided on the back (a surface opposite from a surface in contact with a substrate 16) of the feeding terminals 13. The rib 155 is shaped like a letter T.

When a vibrator 10 is installed into the battery-driven equipment, a part (locking part 155A) crossing the axis of the vibrator 10 of the rib 155 is in contact with the feeding terminals 13. With this configuration, it is possible to prevent the elastic pressing body 122 from being distorted in a separating direction from the feeding terminals 13, thereby improving the workability of installation.

(Embodiment 5)

Like Embodiment 2 to Embodiment 4, the present embodiment is effective in the case where the pressing force of an elastic pressing body is mainly used for pressing feeding terminals onto feeding lands by combining pressing force caused by elastic deformation of the feeding terminals and pressing force caused by elastic deformation of the elastic pressing body. Specific means are shown in FIGS. 6A and 6B or FIGS. 7A and 7B. Here, in these drawings, the same constituent elements as those of FIGS. 1A to 1D, 4A, and 4B are indicated by the same reference numerals and the description thereof is omitted.

Figure 6A:
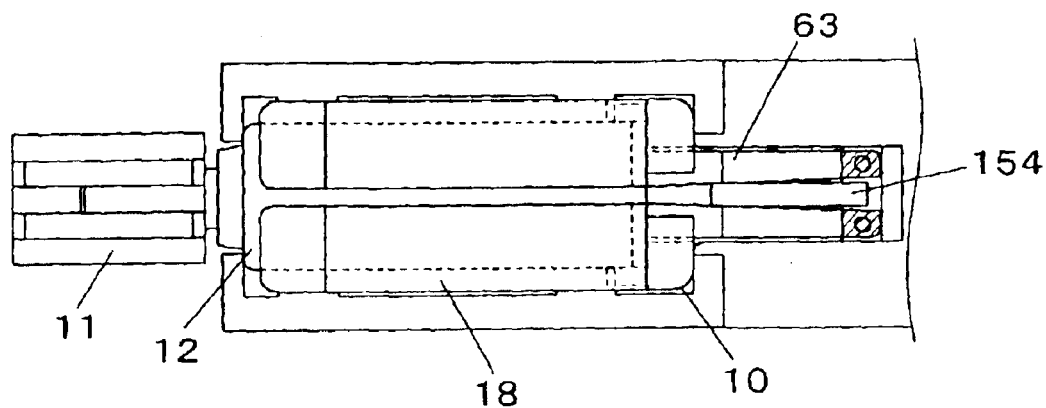
FIG. 6A is a plan view showing a main part of battery-driven equipment which is effective for mainly using the pressing force of the elastic pressing body of the present invention.
Figure 6B:
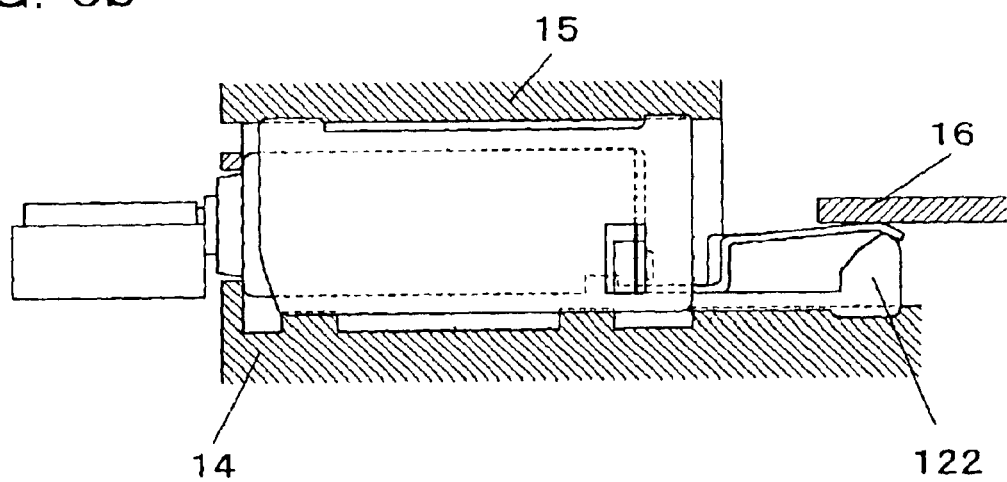
FIG. 6B is a front view (sectional view showing a housing) of FIG. 6A.

FIGS. 6A and 6B are different from FIGS. 4A and 4B in that feeding terminals 63 protruding from around the outer circumference of the bottom of a case 12 of a motor are bent substantially in a perpendicular manner along the bottom of the case 12 at about one third of the entire length, and the feeding terminals 63 are further bent and extend halfway toward the rear of a vibrator (in a separating direction from the bottom of the case 12) within a height range in the diameter direction of the vibrator 10 while tilting with respect to an extending line of the axis center of the case 12.

This configuration is preferable when feeding can be performed by the feeding terminals 63 from feeding lands on the substrate 16 of battery-driven equipment positioned relatively away from the vibrator 10. Since the feeding terminals 63 have smaller inclination as compared with the battery-driven equipment shown in FIGS. 4A and 4B, pressing force caused by elastic deformation of the feeding terminals 63 is reduced. However, distortion of the feeding terminals 63 is reduced and a contact angle with the feeding lands on the substrate 16 of the battery-driven equipment is reduced, thereby improving contact stability.

A reduction in pressing force is compensated by increasing the pressing force of an elastic pressing body 122, so that the same effect can be obtained as the battery-driven equipment of FIGS. 4A and 4B. In addition, the part bent substantially in a perpendicular manner along the bottom of the vibrator of the feeding terminals 63 also serves as an elastic body for vibration caused by the vibrator. Hence, it is possible to largely attenuate transmission of vibration to the substrate 16 of the battery-driven equipment as compared with Embodiment 3.

Figure 7A:
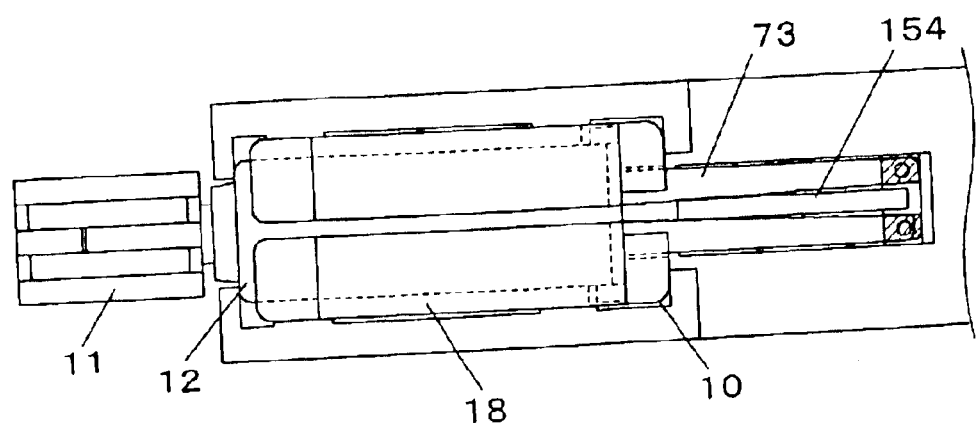
FIG. 7A is a plan view showing a main part of another battery-driven equipment which is effective for mainly using the pressing force of the elastic pressing body of the present invention.
Figure 7B:
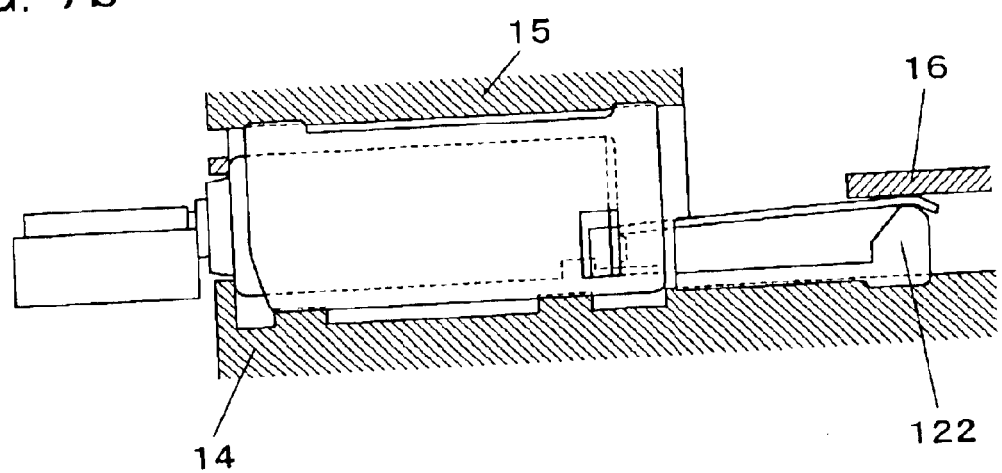
FIG. 7B is a front view (sectional view showing a housing) of FIG. 7A.

FIGS. 7A and 7B show another variation. FIGS. 7A and 7B are different from FIGS. 4A and 4B in that straight feeding terminals 73 of a vibrator 10 are caused to protrude from a bottom in the longitudinal direction of the case 12 of the vibrator and the feeding terminals 73 extend to the rear (in a separating direction from the bottom of the case 12) of the vibrator within a height range in the diameter direction of the vibrator 10 while tilting with respect to an extending line of the axis center of the case 12.

Although the configuration of the battery-driven equipment shown in FIGS. 7A and 7B can achieve the same effect as the battery-driven equipment shown in FIG. 6, a part bent substantially in a perpendicular manner along the bottom of the vibrator of feeding terminals 63 is not provided. Hence, the effect of attenuating transmission of vibration is not obtained. However, since the feeding terminals 73 have simple shapes, high productivity can be achieved.

Additionally, in Embodiment 1 to Embodiment 5, the elastic body 18 is made of a synthetic rubber. Hence, it is possible to readily obtain a feeding terminal pressing structure having an insulating property and a damping vibration property and simultaneously obtain large extending deformation on the elastic body 18.

(Embodiment 6)

Figure 8:
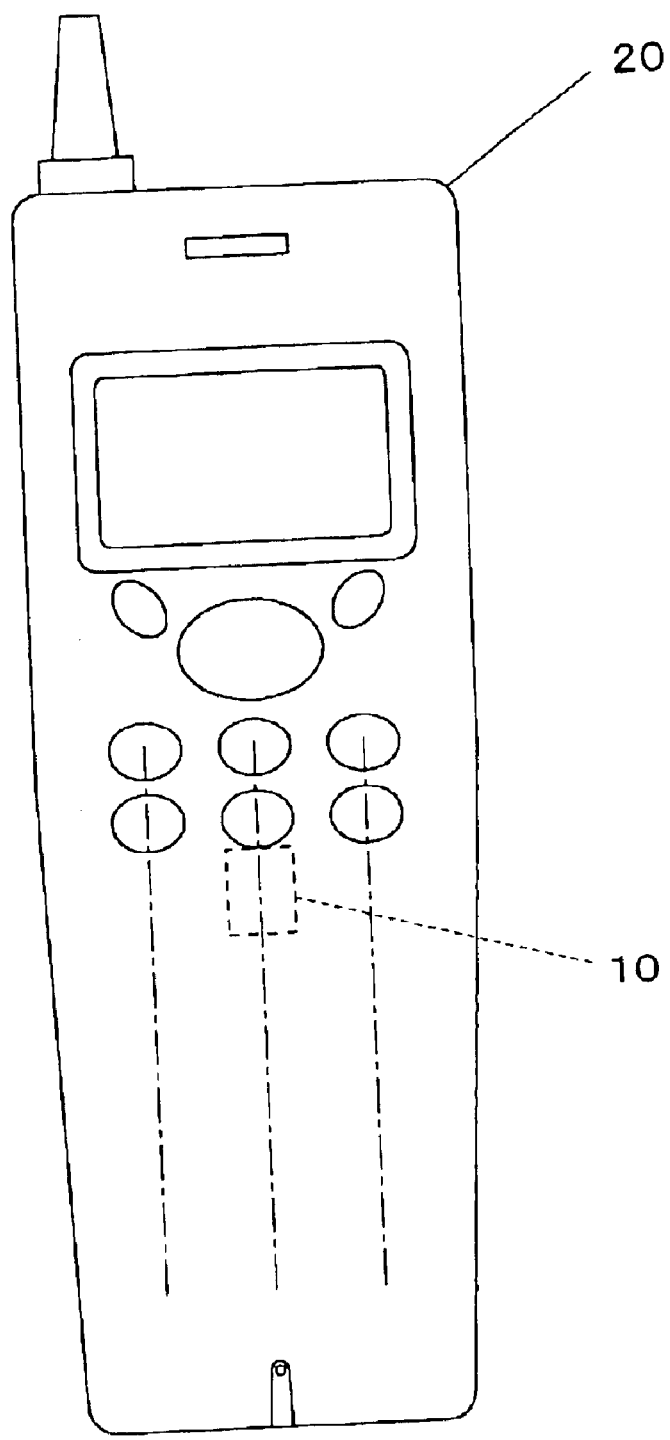
FIG. 8 is a view showing a mobile phone as an embodiment of the battery-driven equipment according to the present invention.
Figure 9A:
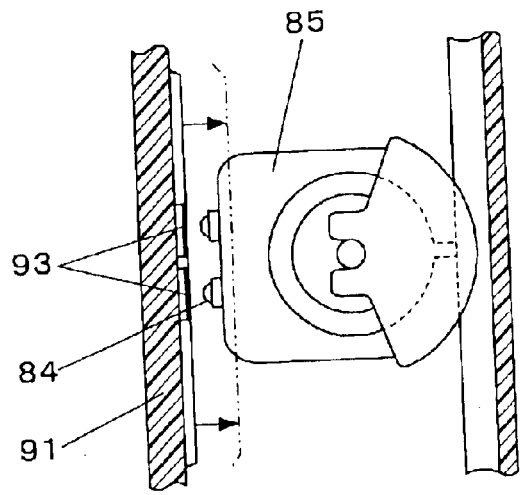
FIG. 9A is a plan view (sectional view showing a housing) showing a main part of a conventional battery-driven equipment.
Figure 9B:
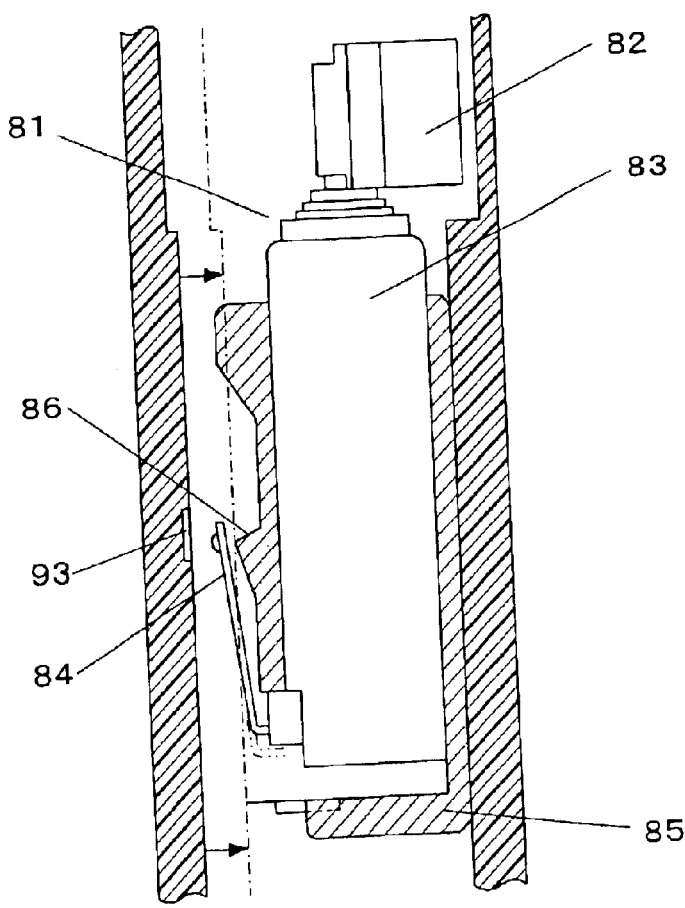
FIG. 9B is a front view (sectional view showing a housing and an elastic body).

FIG. 8 shows a mobile phone as an embodiment of battery-driven equipment. A vibrator 10 according to the embodiments of the present invention is installed into a mobile phone 20. The vibrator 10 is rotatably driven according to the setting of an incoming call and transmits incoming call information to a user by body sensing vibration.

What is claimed is:

1. A battery-driven equipment having a low-profile vibrator, comprising:
   an equipment;
   a substrate portion of the equipment, the substrate having a power feed land mounted thereon;
   a low profile vibrator comprising:
      a motor having an exterior case;
         an eccentric weight attached to a rotating component of the motor;
         a terminal comprising a leaf spring protruding from the case of the motor and connected to the power feed land;
      a housing portion of the equipment, wherein:
         the vibrator is located and fixed between a bottom surface of the housing and a top surface of the housing, and
         the terminal of said vibrator and the power feed land are electrically connected at a point within an outermost cross-sectional profile of the motor that is perpendicular to an axis of rotation of the motor.

2. The battery-driven equipment according to claim 1, wherein the terminal of said vibrator protrudes from the case of the motor in a direction opposite a side of the motor having the eccentric weight and within said outermost cross-sectional profile of the vibrator while tilting with respect to a line extending through the axis of rotation.

3. The battery-driven equipment according to claim 1, further comprising an elastic body, wherein at least a part of the case of the motor is covered with said elastic body so that the elastic body located and fixed between the bottom surface of the housing and the top surface of the housing.

4. The battery-driven equipment according to claim 3, wherein the elastic body comprises a synthetic rubber.

5. The battery-driven equipment according to claim 1, further comprising an elastic pressing body, wherein said elastic pressing body is located between the terminal of the vibrator and the bottom surface of the housing, so that a pressing force caused by elastic deformation of the terminal of the vibrator and applied to the power feed land of the battery-driven equipment is combined with a pressing force caused by elastic deformation of the elastic pressing body.

6. The battery-driven equipment according to claim 5, wherein the elastic pressing body is integral with the elastic body.

7. The battery-driven equipment according to claim 5, wherein the elastic pressing body and the elastic body are separate.

8. The battery-driven equipment according to claim 5, wherein the pressing force caused by elastic deformation of the elastic pressing body is greater than the pressing force caused by elastic deformation of the terminal of the vibrator and applied to the power feed land of the battery-driven equipment.

9. The battery-driven equipment according to claim 5, further comprising a rib and a pair of terminals of the vibrator, wherein the rib is located on the elastic pressing body to protrude between the pair of terminals of the vibrator.

10. The battery-driven equipment according to claim 9, further comprising a locking part, wherein said-locking part is located on the rib, the locking part locked to at least a part of a contact side of the terminal of the vibrator and the power feed land of the battery-driven equipment.

11. The battery-driven equipment according to claim 10, wherein the rib is shaped like a letter T.

* * * * *